US012589341B2

(12) United States Patent
Klein

(10) Patent No.: US 12,589,341 B2
(45) Date of Patent: Mar. 31, 2026

(54) FILTER DEVICE AND FILTER ELEMENT

(71) Applicant: Hydac Filtertechnik GmbH, Sulzbach/Saar (DE)

(72) Inventor: Volkmar Klein, Zweibrücken (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 826 days.

(21) Appl. No.: 17/887,593

(22) Filed: Aug. 15, 2022

(65) Prior Publication Data

US 2024/0050876 A1     Feb. 15, 2024

(51) Int. Cl.
| | |
|---|---|
| B01D 29/96 | (2006.01) |
| B01D 29/15 | (2006.01) |
| B01D 35/30 | (2006.01) |

(52) U.S. Cl.
CPC ............. B01D 29/96 (2013.01); B01D 29/15 (2013.01); B01D 35/30 (2013.01); B01D 2201/291 (2013.01); B01D 2201/302 (2013.01); B01D 2201/347 (2013.01); B01D 2201/4092 (2013.01)

(58) Field of Classification Search
CPC ......... B01D 2201/29; B01D 2201/291; B01D 2201/30; B01D 2201/301; B01D 2201/302; B01D 2201/304; B01D 2201/305; B01D 2201/34; B01D 2201/347; B01D 2201/40; B01D 2201/4061; B01D 2201/4092; B01D 29/11; B01D 29/13; B01D 29/15; B01D 29/96; B01D 29/965; B01D 35/30; B01D 35/306; F16L 27/02
See application file for complete search history.

(56) References Cited

U.S. PATENT DOCUMENTS

| | | | |
|---|---|---|---|
| 5,474,586 A * | 12/1995 | Eaton ..................... | B01D 29/33 |
| | | | 55/378 |
| 7,022,228 B2 | 4/2006 | Hennes et al. | |
| 7,143,897 B1 | 12/2006 | Guzman et al. | |
| 2004/0149640 A1 | 8/2004 | Hennes et al. | |

FOREIGN PATENT DOCUMENTS

| | | | | |
|---|---|---|---|---|
| DE | 696 19 142 | | 9/2002 | |
| DE | 101 42 774 | | 3/2003 | |
| DE | 10 2010 015 494 | | 12/2011 | |
| DE | 102011009926 A1 * | 8/2012 | ............. | B01D 27/08 |
| DE | 10 2015 207 686 | | 10/2016 | |
| WO | 2020/104260 | | 5/2020 | |

OTHER PUBLICATIONS

European Search Report dated May 16, 2023 in European Patent Application No. 22154321.8, with English Translation of Search Report.

* cited by examiner

*Primary Examiner* — Vickie Y Kim

(74) *Attorney, Agent, or Firm* — Wenderoth, Lind & Ponack, L.L.P.

(57) ABSTRACT

A filter device includes a filter head, a replaceable filter element, and a filter bowl for mounting the replaceable filter element. The replaceable filter element includes a compensation device configured to act between the filter head and the replaceable filter element. The compensation device includes a gimbal bearing for establishing a fluid connection with the filter head.

18 Claims, 3 Drawing Sheets

FILTER DEVICE AND FILTER ELEMENT

BACKGROUND OF THE INVENTION

1. Field of the Invention

The invention relates to a filter device having a filter head and having a filter bowl for mounting a replaceable filter element, and to the filter element itself.

2. Description of the Related Art

DE 101 42 774 A1 discloses a filter device of the generic kind having a pot-like filter housing defining a longitudinal axis along which a filter element can be inserted into and removed from the filter housing, and having a retaining device for detachably securing the filter element in the filter housing, which retaining device comprises first and second retaining elements provided on the inside of the filter housing and on the filter element, wherein at least one of the retaining elements has a shape concentric with the longitudinal axis of the filter housing and forming at least a portion of a thread, such that the filter element is secured by a form-fit connection after rotation about its longitudinal axis. The known solution represents a kind of spin-on filter, where the piping of the filter head remains in place in the connected hydraulic circuit and the filter bowl as the housing is unscrewed and screwed on again together with the filter element for the purpose of replacing a used filter element by a new one.

In filter devices of this type, in which, as in the case of the document referred to, element mounts are in form-fit connection with housing parts, such as connector ends of the housing and/or connector ends on the housing cover, extremely tight tolerances have to be maintained in the manufacture of filter housings and filter housing parts to ensure the axes of respective element mounts of the end caps are precisely aligned with the axes of the housing and/or cover retaining elements, such as connector ends. Manufacturing tolerances in the production of housings, in particular in the case of multi-part housing designs having several adjacent housing parts, can lead to misalignments causing distortions in the filter element, resulting in malfunctions or even damage. Filter devices having very elongated filter elements are particularly affected by this problem, because even the smallest angular errors and positional deviations entail large misalignments at the opposite retaining element.

To solve these problems, it has been proposed in WO 2020/104260 A1 for an in-tank solution of a different type, in which the filter head and a tubular filter housing remain stationary on a storage tank and a filter element is replaced by opening the filter head via its housing cover to make provision, in the area of a foot-end mount of the filter element on the filter housing, for the relevant end cap to be mounted on an element mount on the housing end, wherein a bearing providing more than one degree of freedom is used to support the filter element in an articulated manner on the element mount via this end cap. The bearing has a convexly extending bearing surface on the end cap, which is guided in a concavely extending bearing surface in the element mount, wherein the relevant bearing surface is part of a shell, at least one of which has a passage for fluid. The known 360°-swivel-bearing solution is relatively complicated and requires a large number of additional components to be able to reliably seal the bearing and its individual bearing surfaces in the manner of a ball joint from the tank interior to the tubular housing end.

Based on this prior art, the invention addresses the problem of further improving a filter device of the type mentioned above in such a way that misalignments and manufacturing tolerances can be compensated for, wherein at the same time a safe operating behavior is to be achieved using an efficient and cost-effective type of manufacture.

SUMMARY OF THE INVENTION

According to the invention, this problem is solved by a filter device described herein and by a filter element described herein.

In this regard, a compensation device is provided, which acts between the filter head and the filter element, which is a component of the filter element and which has a gimbal bearing for establishing a fluid-conveying connection with the filter head, compensation is available for any misalignment errors, permitting an increase of the narrow tolerance limits to be complied with for production, and filter devices having long filter elements or having assembled filter housings can thus also be produced in an operationally reliable manner and at favorable production costs. Furthermore, the gimbal bearing can be mounted at a central point on the filter element, thus saving installation space. Initially, the filter element can be attached to the stationary filter head by screwing it on, and tolerance compensation and misalignment compensation occur only at the fluid transition point between the passage opening of the compensation device and the stationary fluid-conveying parts of the filter head. The filter bowl is then secured to the filter head by screwing it on, wherein the filter element engages with the inside of the filter bowl.

The correspondingly designed filter element for use in a filter device of this type is when spent, in conjunction with the compensation device, replaced by a new element, such that a new compensation device is always used at the same time as the new filter element, such that any leaks that may occur in the area where the bearing surfaces contact each other in the long-term during operation are of no significance at all.

A gimbal bearing or a gimbal suspension in terms of this invention denotes the suspension of an object, here in the form of the filter element, on a frame, here in the form of the compensation device, with the aid of two intersecting rotary bearings at right angles to each other. Preferably, the gimbal bearing is arranged on an end cap of the filter element, which cap faces the filter head and has two perpendicular, intersecting swivel axes. In this way, the gimbal bearing is an integral part of the end cap of the filter element as a compensation device and is integrated into this end cap in both the axial and radial directions to save installation space.

In a preferred embodiment, provision is made for a cross piece to be used to form the two swivel axes, with two opposing mounting blocks for swivel mounting a connector end and with two bearing blocks for swivel mounting the cross piece in the end cap of the filter element. Preferably, the cross piece has an annular body with the two mounting blocks, which have two corresponding recesses for mounting assignable axles to the connector end. Furthermore, preferably provision is made for the mounting blocks to be arranged on the cross piece offset by 90° radially to the bearing blocks and that the bearing blocks engage with their facing bearing axes in assigned axle blocks on the element cap. Preferably, the centers of the bearing axes of the cross piece and the center axes of the recess of the cross piece are perpendicular to each other. In this way, the gimbal bearing for the fluid-conveying connection of the filter element to the filter head can be produced using only three components, i.e., the end cap, the cross piece and the connector end. By means of the arrangement of the axle stubs via a kind of annular structure according to the invention, the required fluid channel is kept free as viewed from the flow cross-section, i.e., the free flow of fluid is not impaired in any way.

Preferably, the aforementioned three components of the gimbal bearing are made of molded or injection-molded plastic parts that can be interconnected in the manner of a clip connection while producing the swivel bearings. In this way, a modular system is also achieved through the component design, in which different sizes can be provided for the connector end, the cross piece and the end cap, depending on the filter device to be installed and the filter element to be integrated.

A particularly space-saving design is achieved if, in a preferred embodiment of the filter device according to the invention, provision is made for the two mounting blocks to project into a passage opening as part of the fluid-conveying connection in the connector end and for the two bearing blocks to extend outside of the connector end.

In that, according to the invention, the connector end has a male thread, which engages with a mounting thread in the filter head and in that the longitudinal thread axis of the mounting thread has a predeterminable angle of inclination relative to a longitudinal axis of the filter bowl, a quick and easy-to-handle replacement can be achieved via the threaded connection between the connector end and the filter head when a used filter element is replaced by a new element. Since, as explained above, no further attention needs to be paid to manufacturing tolerances with regard to the gimbal bearing in the form of the compensation device, a deliberate oblique position can also be taken between the longitudinal axes of an assignable mounting opening in the filter head and that of the longitudinal axis of the hollow cylindrical connector end, to obtain a kind of copy protection or plagiarism protection in this way, to prevent any technically inferior standard filter elements from being inserted into the filter device. As is well known, such counterfeits are not always recognizable to the user, and unknowingly substituting them can result in the failure not only of the filter device, but also of components of a hydraulic circuit connected to the filter device. This must be avoided at all cost, which is achieved by the filter device described herein.

Preferably, provision is made for the gimbal-mounted connector end to bear a sealing ring on its outer circumference, which sealing ring seals the end cap at the level of engagement of the bearing blocks in the axle blocks with respect to the end cap. In this way, a secure seal is created between the filtrate side of the connector end and the feed side of the filter device, wherein this sealing can also withstand high pressures, since the preferably selected O-sealing ring can be arranged chambered in a matching mounting groove on the outer circumference of the connector end.

In a further preferred embodiment of the filter device, provision is made for the male thread of the connector end to project beyond the top of the end cap in the direction of the filter head. In this way, the connector end can be set at an angle to the mount in the filter head in a wide frame, which on the one hand serves to effectively compensate for misalignments and tolerance errors and on the other hand permits the functionally reliable removal and installation of the filter element.

The filter element according to the invention, in particular as provided for the filter device described above, has the features relating thereto concerning the compensation device within the framework of a gimbal bearing on one of the element caps and furthermore has a circumferential sealing device with a replaceable sealing ring for the purpose of securing the filter element in a filter bowl of the filter device once the filter bowl is secured to the filter head. However, the solution according to the invention does not require such a circumferential sealing device within the scope of the implementation of the gimbal bearing.

The particular embodiment of a filter element to this effect is described below. In this context, the advantages described above concerning the filter device as a whole are also fulfilled for the filter element as such.

BRIEF DESCRIPTION OF THE DRAWINGS

Below, the filter device according to the invention and the filter element will be explained in more detail based on an exemplary embodiment according to the drawing. In the figures, in schematic representation, not to scale.

DETAILED DESCRIPTION OF THE INVENTION

Figure 1:
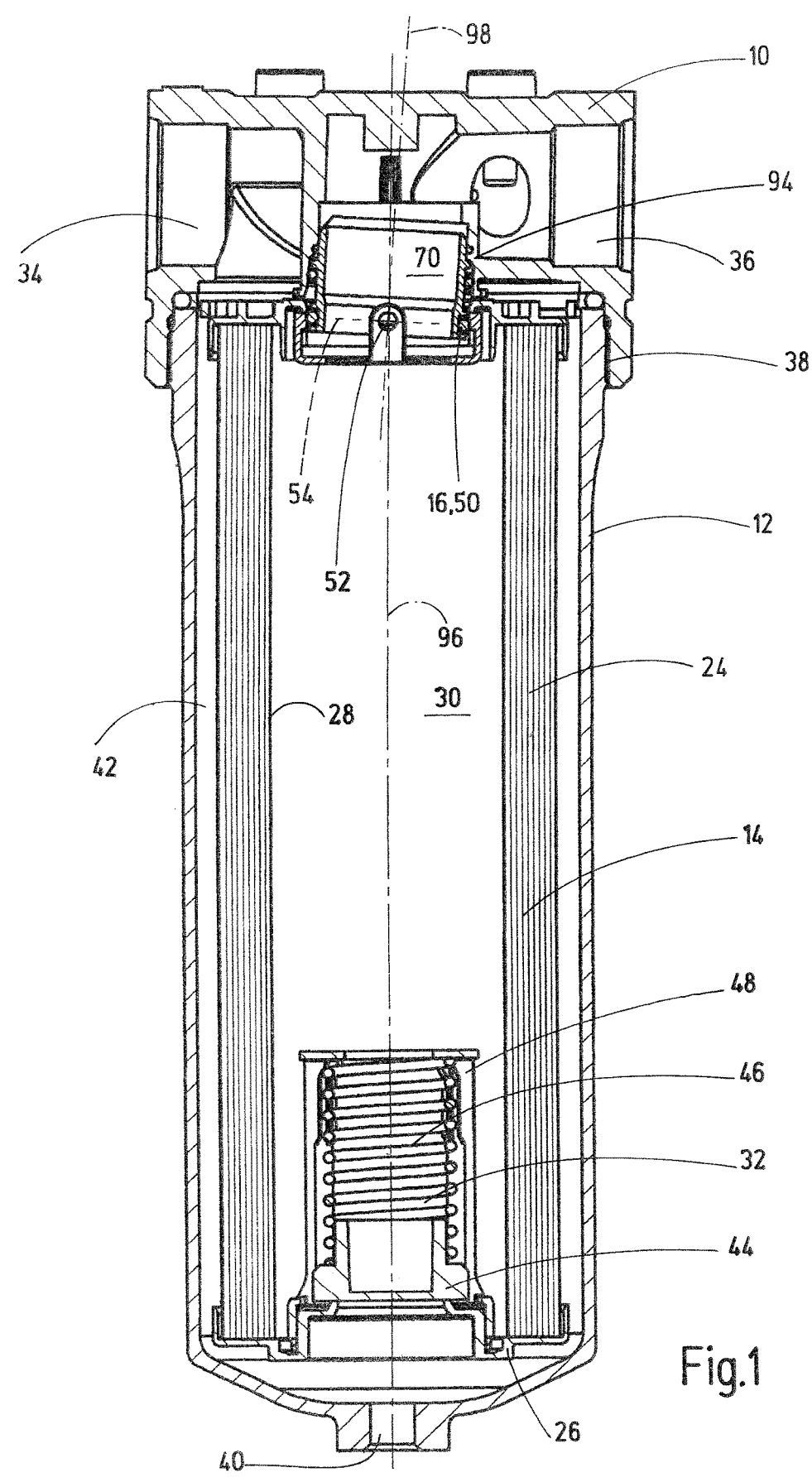
FIG. 1 shows a longitudinal section of the filter element mounted in a filter bowl including the compensation device, which is secured to a stationary filter head.

The filter device shown in FIG. 1 and its individual components shown as a longitudinal section has a filter head 10 and a filter bowl 12, in which a replaceable filter element 14 is mounted. Between the filter head 10 and the filter element 14 there is a balancing device, designated as a whole by 16, shown in more detail in FIGS. 2 to 4. The compensation device 16 is part of the filter element 14 and consists of three components in the form of a connector end 18 (FIG. 2), a cross piece 20 (FIG. 3) and an upper end cap 22 (FIG. 4) of the filter element 14.

The filter element 14 comprises a filter medium or filter element material 24 extending between the upper end cap 22 and a lower end cap 26. Further, the element material 24, when viewed from the outside in the direction of flow, is supported on a cylindrical perforated support tube 28, not shown in detail, which comprises a cylindrical interior of the filter element 14 as a filtrate chamber 30. This filtrate chamber 30, as viewed in the direction of FIG. 1, is closed off at the bottom by a bypass valve 32 as part of the lower end cap 26.

The filter head 10 is stationarily connected to a piping of a hydraulic circuit not shown in detail and comprises an inlet 34 for unfiltered matter and an outlet 36 for filtrate. The filter bowl 12 is screwed into the filter head 10 in a re-releasable manner via a threaded section 38, and the filter bowl 12 is closed at the bottom except for a drain opening 40, into which a drain screw, not shown in more detail, is inserted. The filter bowl 12 surrounds the filter element 14, which is exchangeably mounted, with a radial clearance, and a chamber for unfiltered matter 42 is formed by said radial clearance, which is supplied with fluid via the inlet 34. If a so-called blocking of the filter element material 24 occurs due to contamination, the bypass valve 32 opens by opening a valve part 44 against the action of a compression spring 46 and the fluid flow can flow off from the bottom end via lateral wall openings in the valve housing 48 in the direction of the filtrate chamber 30 and then reaches the drain 36 of the filter head 10 via the compensation device 16. Because the filter element material 24 is clogged and consequently blocked only after a plurality of particle contamination cleaning operations, the fluid flow passing through the filter element 14 is already cleaned to such an extent that the bypass essentially poses no risk to the connected components of the hydraulic circuit.

Figure 5:
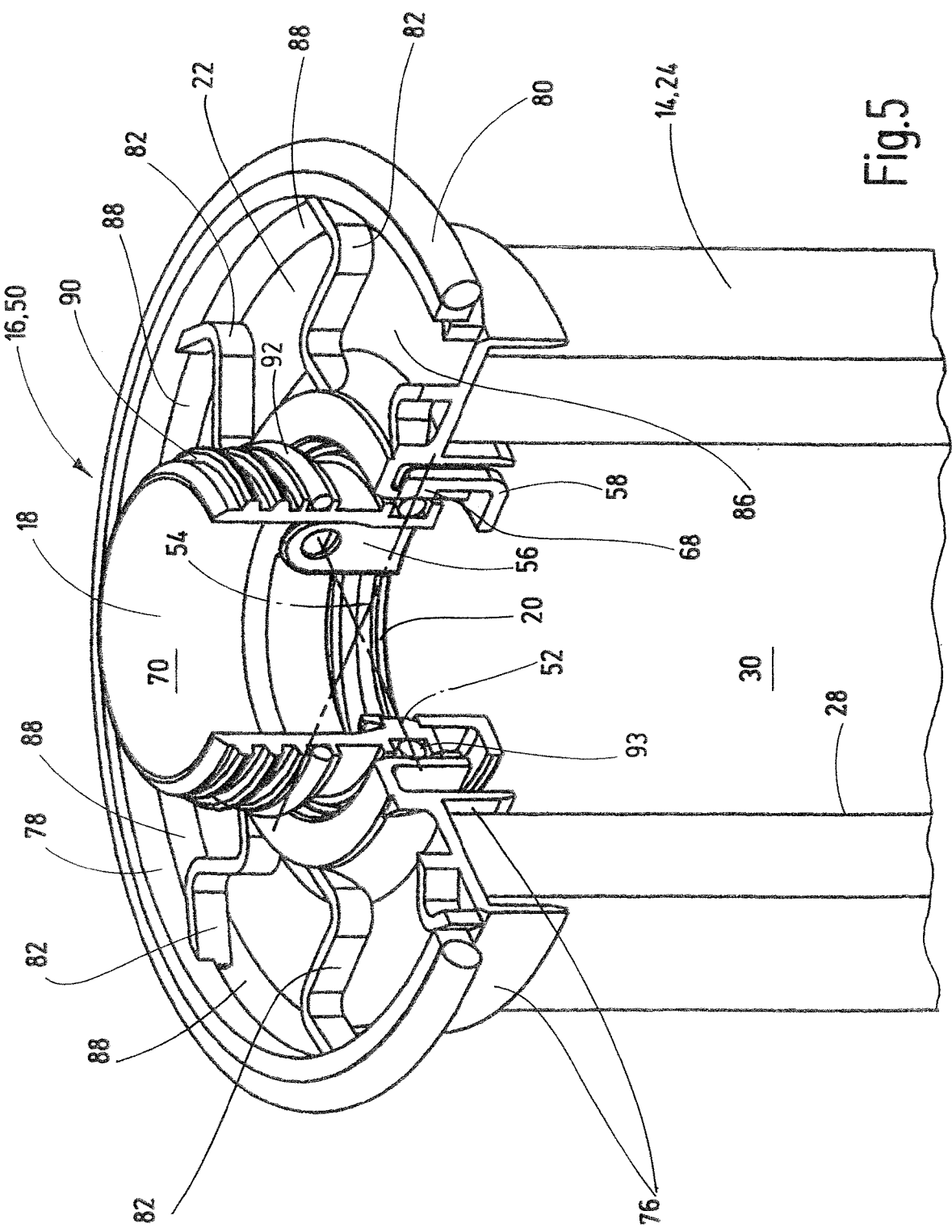
FIG. 5 shows an oblique view of a partial section through the upper portion of a filter element as used in FIG. 1.

The compensation device 16, which is part of the upper end cap 22 of the filter element 14 and thus also part of this filter element 14 itself, comprises a gimbal bearing 50, as shown in particular in FIG. 5, for establishing the afore-mentioned fluid-conveying connection between the filtrate chamber 30 and the drain 36. The gimbal bearing comprises perpendicular, intersecting swivel axes 52, 54, wherein the cross piece 20 and its two opposing mounting blocks 56 for swivel mounting the connector end 18 and its two bearing blocks 58 for swivel mounting the cross piece 20 in the upper end cap 22 of the filter element 14 is used to form these two swivel axes 52, 54.

Figures 2, 3, 4:
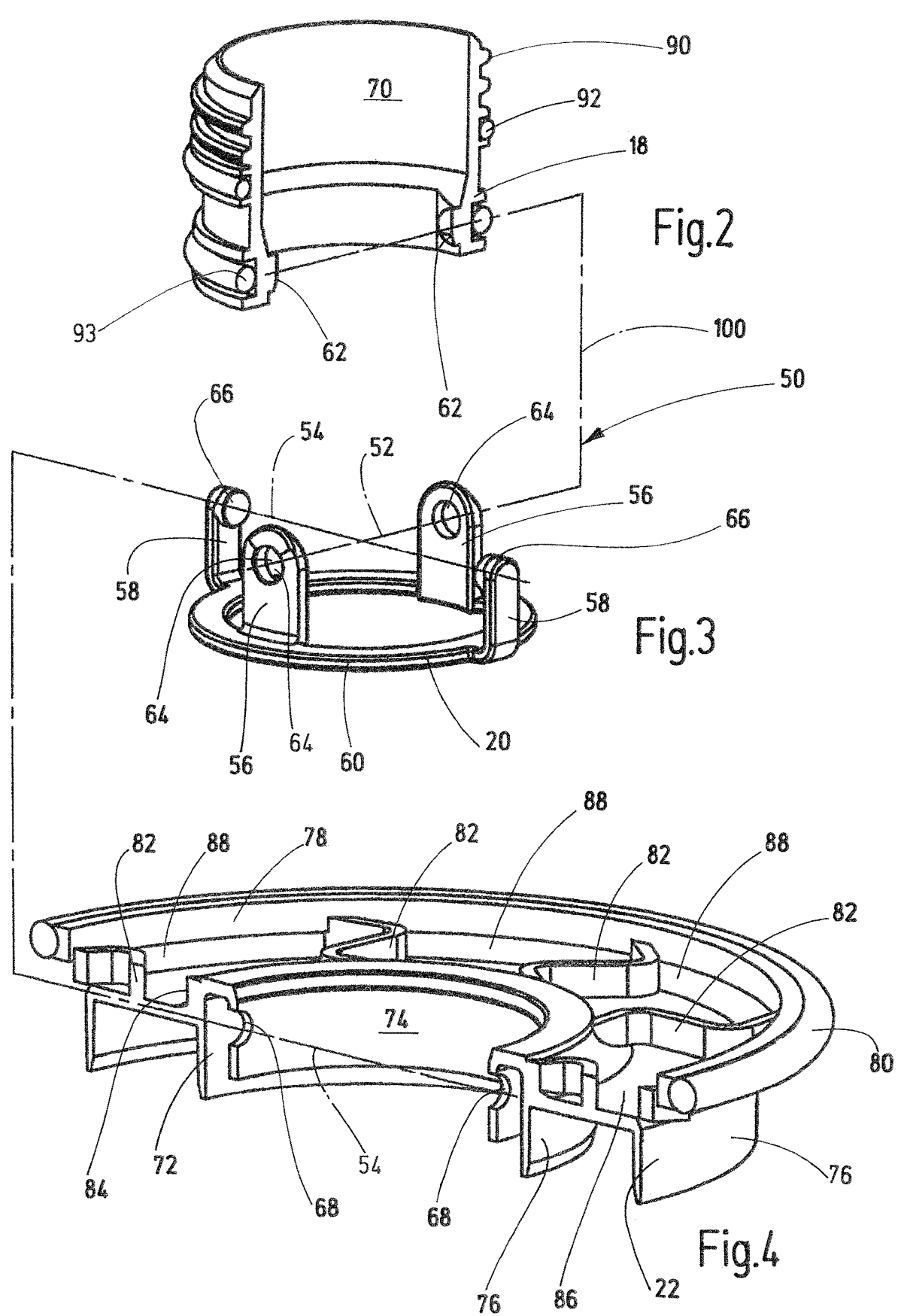
FIG. 2 shows an assembly drawing of the main components of the gimbal bearing in the form of the compensation device shown in FIG. 1.
FIG. 3 shows an assembly drawing of the main components of the gimbal bearing in the form of the compensation device shown in FIG. 1.
FIG. 4 shows an assembly drawing of the main components of the gimbal bearing in the form of the compensation device shown in FIG. 1.

In particular, as shown in FIG. 3, the cross piece 20 comprises an annular body 60 with the pairs of mounting blocks 56 and bearing blocks 58. These are formed by bars projecting from the annular body 60, wherein the mounting blocks 56 engage with the annular body 60 on the inner circumference and the bearing blocks 58 engage with the annular body 60 on the outer circumference. Further, the upwardly projecting bars have mainly the same bar height and the annular body 60 is designed as a flat disc. In particular, the mounting blocks 56 and the bearing blocks 58 are attached to the annular body 60 in such a way that the swivel axes 52, 54 spanned by these blocks, intersect perpendicularly, as shown in FIG. 3 and FIG. 5. The two mounting blocks 56 comprise two matching recesses 64 for mounting assignable axles 62 on the connector end 18, with which recesses the axles 62 engage in the form of axle stubs in the assembled state of the compensation device 16 and which are swivel mounted in the mounting blocks 56 in this way.

The mounting blocks 56 are arranged on the cross piece 20 offset radially by 90° with respect to the bearing blocks 58, wherein the bearing axes 66, facing each other, in the form of axle stubs of the bearing blocks 58 in turn engage with assigned circular axle blocks 68 on the element cap 22 in a swiveling manner. The centers of the bearing axles 66 of the cross piece 20 and the center axes of the recesses 64 of the cross piece 20 are perpendicular to each other in an intersecting manner, and if the three components are clipped together according to FIGS. 2 to 4, the connector end 18 is guided in a swiveling manner in the cross piece 20 along the first swivel axis 52 and the cross piece 20 with the connector end 18 is in turn swivel mounted in the element cap 22 along the second swivel axis 54. In this way, the gimbal bearing 50 for the compensation device 16 is achieved using the described axle bearings with the swivel axles 52, 54.

A particularly space-saving design, especially as viewed in the axial direction of construction, is achieved in that the two mounting blocks 56 project from the inside into a passage opening 70 as part of the fluid-conveying connec-tion from the feed side to the filtrate side of the filter device in the connector end 18, as shown in FIG. 5, from the inside, and the two bearing blocks 58 extend outside of the con-nector end 18 and engage with the end cap 22 in an annular space 72, which is delimited inwards by a circumferential rim 74, with the two circular-cylindrical axle blocks 68 diametrically opposite one another with respect to the lon-gitudinal axis of the element 14. Outwards, the annular space 72 is delimited by wall parts of an element mount 76 that form a channel-like mounting space for the upper mount of the filter element 14. In this manner, for instance, an adhesive bed permits the filter element material 24 to be mounted in both the upper end cap 22 and the lower cap 26.

The upper element cap 22 comprises an axially and radially projecting circumferential sealing rim 78, which forms an annular mounting channel towards the outside for mounting an O-sealing ring 80 made of an elastomer mate-rial. The sealing ring support or sealing rim 78 is integrally connected to an inner rim 84 of the end cap 22 via S-shaped bars 82, which are otherwise an integral part of the end cap 22 itself, wherein the bars 82 extend on the upper surface 86 of the end cap 22. Between the outer circumference of the element mount 76 and the inner surface of the sealing rim 78, which is held spaced apart from the inner rim 84 by the S-shaped bars 82, individual passage openings 88 are left free as part of the fluid guidance, and it is through these passage openings 88 that the feed flow from the inlet 34 enters the chamber for unfiltered matter 42.

As FIG. 1 further shows, when the filter head 10 is screwed on, the sealing ring 80 is pressed against wall parts of the filter head 10 in a sealing manner, for which purpose the sealing ring 80 is secured projecting upwards and downwards in the axial direction on the sealing rim 78. In this respect, the sealing ring 80 of the sealing rim 78 rests on the free end face of the filter bowl 12. As a further sealing device in this connection area, provision is also made for a further circumferential sealing ring 92 in the form of an O-sealing ring to be provided on a male thread 90 of the connector end 18. A further sealing ring 93 seals the filtrate side of the end cap 22 from the feed side at the level of engagement of the bearing blocks 58 with the assigned axle blocks 68. In this respect, the male thread 90 of the con-nector end 18 protrudes beyond the top 86 of the end cap 22 in the direction of the filter head 10.

A matching threaded mount in the form of a mounting thread 94 is provided in the filter head 10 for securing the filter element 14 via the male thread 90 of the connector end 18. As shown in particular in FIG. 1, there can be an angular offset due to misalignment and tolerance errors between the longitudinal axis 96 of the device and a central axis 98 through the compensation device 16. The gimbal bearing 50 can be used to easily compensate the angular misalignment between the axes 96 and 98, as shown in particular in FIG. 1. If the element and the housing have one and the same thread pitch with a correspondingly aligned threaded sec-tion, it is theoretically possible to secure the element in conjunction with the housing to the filter head; however, it is usually provided for the element to be secured to the filter head first and then the filter bowl. Any new element to be replaced will then in turn have the same compensation device 16 with gimbal bearing 50 for replacement in the stationary filter head 10 shown.

However, the angular offset shown between the axes 96 and 98 can also be deliberately brought about in order to achieve a kind of copycat protection or plagiarism protection in this way. For this purpose, the mounting thread 94 in the filter head 12 has to be designed to extend at an angle, for instance along the center axis 98; filter elements without a compensation device and having a gimbal bearing of the connection thread cannot then be replaced by screwing them into the filter head 10. In this way, conventional filter elements cannot be replaced in the filter device without the compensation device 16. Often, the user does not recognize such counterfeit elements as such and if they are accidentally used as replacements, they can cause great damage to the components of the connected hydraulic system because of their frequently inferior element quality. This is reliably avoided by the imitation protection shown here.

The three components shown in FIGS. 2 to 4 are formed, in particular, from plastic materials and can be swivel connected to one another in the outlined frame using clips in accordance with the assembly sequence indicated by 100. The filter element 14 as a whole with the element material 24 and the two end caps 22 and 26 in conjunction with the compensation device 16 in the form of the gimbal bearing 50 is designed as a replacement element and the advantages described above for the device also extend in this respect to the filter element 14 itself.

The invention claimed is:

1. A filter device comprising:
a filter head;
a replaceable filter element;
a filter bowl for mounting the replaceable filter element; and
a compensation device,
wherein:
the compensation device is configured to act between the filter head and the replaceable filter element;
the compensation device is a component of the replaceable filter element;
the compensation device includes a gimbal bearing for establishing a fluid connection with the filter head;
the gimbal bearing is on an end cap of the replaceable filter element; and
the end cap of the replaceable filter element faces the filter head and has two perpendicular, intersecting swivel axes.

2. The filter device of claim 1, wherein:
a cross piece defines the two perpendicular, intersecting swivel axes;
the cross piece includes two opposing mounting blocks for swivel mounting a connector end; and
the cross piece includes two bearing blocks for swivel mounting the cross piece in the end cap of the replaceable filter element.

3. The filter device of claim 2, wherein:
the cross piece has an annular body with the two opposing mounting blocks; and
the two opposing mounting blocks include two corresponding recesses for mounting assignable axes on the connector end.

4. The filter device of claim 2, wherein:
the two opposing mounting blocks are radially offset on the cross piece by 90° with respect to the two bearing blocks; and
two facing bearing axes of the two bearing blocks are configured to engage with assigned axle blocks on the end cap of the replaceable filter element.

5. The filter device of claim 4, wherein center axes of the two facing bearing axes of the two bearing blocks and center axes of two recesses of the two opposing mounting blocks are perpendicular and intersecting.

6. The filter device of claim 2, wherein:
the two opposing mounting blocks project into a passage opening in the connector end as part of the fluid connection; and
the two bearing blocks extend outside the connector end.

7. The filter device of claim 2, wherein:
the connector end includes a male thread configured to engage in a mounting thread in the filter head; and
a longitudinal thread axis of the mounting thread is configured to have an angle of inclination relative to a longitudinal axis of the filter bowl.

8. The filter device of claim 2, wherein:
the connector end is mounted on the gimbal bearing;
the connector end bears a sealing ring on an outer circumference thereof; and
the sealing ring is configured to seal the end cap of the replacement filter element at a level of engagement of the two bearing blocks in axle blocks with respect to the end cap of the replacement filter element.

9. The filter device of claim 7, wherein the male thread of the connector end projects beyond a top of the end cap of the replaceable filter element in a direction of the filter head.

10. A filter element for the filter device of claim 1, the filter element comprising:
a compensation device,
wherein:
the compensation device includes a gimbal bearing;
the gimbal bearing is on an end cap of the filter element; and
the end cap has two perpendicular, intersecting swivel axes.

11. The filter element of claim 10, wherein:
a cross piece defines the two perpendicular, intersecting swivel axes;
the cross piece includes two opposing mounting blocks for swivel mounting a connector end; and
the cross piece includes two bearing blocks for swivel mounting the cross piece in the end cap of the replaceable filter element.

12. The filter element of claim 11, wherein:
the cross piece has an annular body with the two opposing mounting blocks; and
the two opposing mounting blocks include two corresponding recesses for mounting assignable axes on the connector end.

13. The filter element of claim 11, wherein:
the two opposing mounting blocks are radially offset on the cross piece by 90° with respect to the two bearing blocks; and
two facing bearing axes of the two bearing blocks are configured to engage with assigned axle blocks on the end cap of the replaceable filter element.

14. The filter element of claim 13, wherein center axes of the two facing bearing axes of the two bearing blocks and center axes of two recesses of the two opposing mounting blocks are perpendicular and intersecting.

15. The filter element of claim 11, wherein:
the two opposing mounting blocks project into a passage opening in the connector end as part of the fluid connection; and
the two bearing blocks extend outside the connector end.

16. The filter element of claim 11, wherein the connector end includes a male thread configured to assume an angle of inclination by the gimbal bearing.

17. The filter element of claim 11, wherein:

the connector end is mounted on the gimbal bearing;

the connector end bears a sealing ring on an outer circumference thereof; and the sealing ring is configured to seal the end cap of the replacement filter element at a level of engagement of the two bearing blocks in axle blocks with respect to the end cap of the replacement filter element.

18. The filter element of claim 16, wherein the male thread of the connector end projects beyond a top of the end cap of the replaceable filter element in a direction of the filter head.

\* \* \* \* \*